United States Patent Office 3,801,635
Patented Apr. 2, 1974

3,801,635
N-(2-METHYL-4-CHLOROPHENYL)-
N',N'-DIMETHYLTHIOUREA
Dieter Duerr, Bottmingen, and Volker Dittrich, Basel, Switzerland, assignors to Ciba-Geigy AG, Basel, Switzerland
No Drawing. Continuation-in-part of abandoned application Ser. No. 680,272, July 6, 1967, which is a division of application Ser. No. 532,863, Mar. 9, 1966, now Patent No. 3,395,233. This application Feb. 9, 1972, Ser. No. 224,958
Claims priority, application Switzerland, Mar. 30, 1965, 4,389/65
Int. Cl. C07c 157/08
U.S. Cl. 260—552 R            1 Claim

ABSTRACT OF THE DISCLOSURE

There are provided novel N-2-alkyl-4-halophenyl-N'-alkyl- or N'-alkoxy-thioureas optionally further substituted by lower alkyl at the N'-position. These compounds are useful as pesticides.

CROSS REFERENCES

This application is a continuation-in-part of application Ser. No. 680,272, filed July 6, 1967, now abandoned which in turn is a division of application Ser. No. 532,863, filed Mar. 9, 1966, now Pat. No. 3,395,233.

DESCRIPTION OF THE INVENTION

The present invention provides pesticidally, especially insecticidally and acaricidally effective compounds of the formula

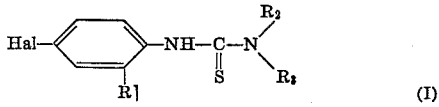
(I)

wherein Hal represents chlorine or bromine and $R_1$ is lower alkyl, $R_2$ lower alkyl or lower alkoxy and $R_3$ hydrogen or lower alkyl.

The term "lower" is used above for such alkyl and alkoxy radicals which contain 1 to 4 carbon atoms. The alkyl moieties may be straight or branched. Advantageously they are straight and contain 1 or 2 carbon atoms. Consequently, especially valuable compounds correspond to the formula

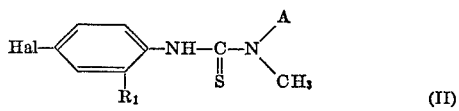
(II)

wherein Hal represents chlorine or bromine and $R_1$ is methyl or ethyl and A represents hydrogen or methyl or methoxy. Examples of such outstanding compounds correspond e.g. to the formulae

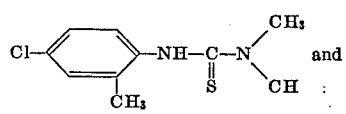 and

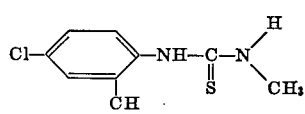

The new compounds are especially advantageous when used for combating acarides; in this field it is of particular interest that they act against all stages of development, including the ova of the acarides. However, they are useful not only against acarides, but also against harmful insects, molluscs, nematodes and microorganisms such as fungi and weeds.

The compounds of Formula I may be manufactured in known methods. Some of such known methods are represented by the following reaction schemes, wherein Hal and $R_1$ to $R_3$ have the meanings set forth above:

TABLE I (1) 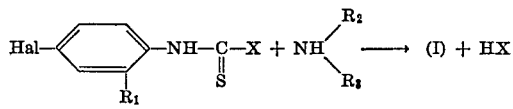

(2) 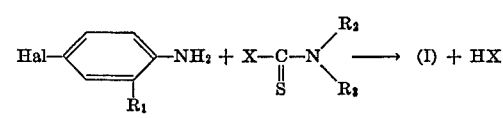

The symbol X stands for the group which is eliminated during the reaction, for example the $NH_2$ alkylthio, alkoxy, phenoxy group or halogen.

(3) 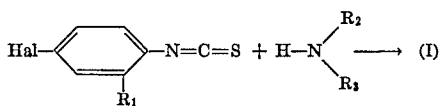

(4) When $R_3$ represents hydrogen:

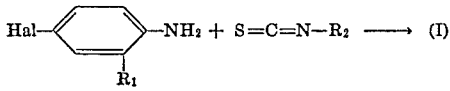

The compounds of Formula I may be used alone or together with suitable additives which belong to the common knowledge of those skilled in the art.

To manufacture solutions of compounds of the General Formula I for direct spraying there may be used, for example, petroleum fractions having a high to medium boiling range, preferably above 100° C., for example diesel oil or kerosene, coal tar oils and oils of vegetable or animal origin, also hydrocarbons, for example alkylated naphthalenes, or tetrahydronaphthalene, if desired in combination with xylene mixtures, cyclohexanols or ketones, furthermore chlorinated hydrocarbons for example tri- and tetrachloroethane, trichloroethylene or tri- or tetra-chlorobenzenes.

Aqueous forms of applications are obtained, for example, from emulsion concentrates, pastes or wettable powders by addition of water. Suitable emulsifiers, or dispersants are, for example, non-ionic products for example condensation products of ethylene oxide with aliphatic alcohols, amines or carboxylic acids having a long-chain hydrocarbon residue of about 10 to 20 carbon atoms, for example the condensation product of octa-decyl alcohol with 25 to 30 mols of ethylene oxide, or of soybean fatty acid with 30 mols of ethylene oxide, or of commercial oleylamine with 15 mols of ethylene oxide. or of dodecylmercaptan with 12 mols of ethylene oxide. Amongst the suitable anionic emulsifiers, there may be mentioned the sodium salt of dodecyl alcohol sulphuric acid ester, the sodium salt of dodecylbenzenesulphonic acid, the potassium or triethanolamine salt of oleic or abietic acid or of mixtures of these acids, or the sodium salt of a petroleum sulphonic acid. Suitable cationic dispersants are quaternary ammonium compounds for example cetyl pyridinium bromide or dihydroxyethylbenzyl dodecyl ammonium chloride.

In the manufacture of dusting or casting preparations there may be used, as solid vehicles, talcum, kaolin, bentonite, calcium carbonate, calcium phosphate or coal, cork meal, wood meal or other materials of vegetable origin. It is also very advantageous to manufacture the new preparations in granular form. The various forms of application may contain the conventional additives for improving the distribution, adhesion, stability to rain and penetration, for example fatty acids, resins, glues, casein or alginates.

The preparations of the present invention may be used by themselves or in conjunction or admixture with conventional pesticides, especially insecticides, acaricides, nematocides, bactericides or fungicides or selective herbicides.

The content of active ingredient may vary within wide limits. As a rule the preparations contain 0.1 to 95% of active ingredient; thus diluted preparations may range up to 10%, whereas concentrates range from 10 to 95%.

EXAMPLE 1

(a) N-4-chloro-2-methylphenyl - N',N'-dimethyl-thiourea.—110 grams of 4-chloro-2-methylphenyl isothiocyanate are dissolved in 300 ml. of acetonitrile, and 75 ml. of aqueous dimethylamine solution of 40% strength are added. The temperature of the solution rises; 30 minutes later the product formed is precipitated by adding 1 liter of water, Yield: 131 grams. M.P. 173° to 175° C.

(b) N - 4-chloro-2-methylphenyl-N'-methylthiourea.— A solution of 111.8 g. of 4-chloro-2-methylaniline in 250 ml. of alcohol is mixed with 57.6 g. of methyl isothiocyanate and refluxed for 90 minutes. On addition of 1 liter of cold water, the urea formed is precipitated in the form of white crystals. Yield: 103 grams. M.P. 143.5° to 144.5° C.

(c) Further N-4-chloro-2-methylphenyl thioureas are obtained when dimethylamine in Example 1(a) is replaced by one of the following amines: Ethylamine, propylamine (normal or iso), butylamine (normal, iso or secondary), methylethylamine, a methylpropylamine, a dipropylamine or a dibutylamine.

(d) In the same manner as described in Example 1(a), the following compounds are obtained from the appropriate monomethylamine or dimethylamine respectively and the appropriate phenyl isothiocyanate:

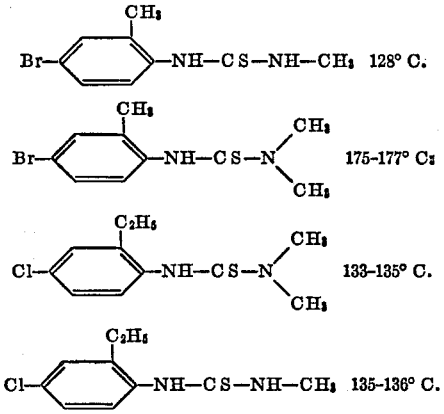

(e) The compound of the formula

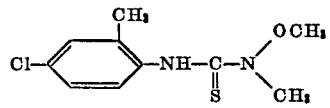

(melting at 98 to 100° C.) is obtained by reacting O,N-dimethylhydroxylamine with 4-chloro-2 - methylphenyl isothiocyanate as described in Example 1(a).

EXAMPLE 2

8 grams of the substance obtained in Example 1(a) are mixed with 8 g. of a mixture consisting of 400 parts of finely dispersed silica ("Hisil," registered trade name), 500 parts of kaolin (bolus alba), 70 g. of a condensation product of 1 mol of para-octylphenol with 6 to 10 mols of ethylene oxide and 30 g. of a wetting agent consisting of sodium heptadecenyl benzimidazolesulphonate, and the whole is then ground on a rod mill, to furnish a spray powder of 50% strength which gives with water, dispersions that can be diluted in any desired proportion.

EXAMPLE 3

(a) Ovicidal effect.—Bush bean plants in the 2-leaf stage are infested with adult female spinning mites *Tetranychus telarius* (carmine red mite) by means of a pneumatic collector. After 24 hours, the female mites are blown off the leaves with a fine jet of carbon dioxide. The remaining ova, which are 1 to 24 hours old, were wetted after 24 and 48 hours with a fine spray of aqueous sprayable preparations of different concentrations obtained by diluting the active substance obtained as described in Example 2. The following figures, representing the percentages of surviving larvae and dead ova are obtained by counting them:

TABLE II

| Concentration in percent | After 24 hours | | | After 48 hours | | |
|---|---|---|---|---|---|---|
| | Larvae | Ova | Killed | Larvae | Ova | Killed |
| 0.01 | 0 | 50 | 100 | 1 | 106 | 99 |
| 0.005 | 2 | 98 | 98 | 4 | 89 | 96 |
| 0.0025 | 0 | 50 | 100 | 2 | 78 | 98 |

(b) Acaricidal effect.—Bush bean plants in the 2-leaf stage, infested with all stages of *Tetranychus telarius* (carmine red mite) were sprayed all over with a spray broth obtained by diluting the pulverulent substance of Example 2 with water. Evaluation of the effect obtained was carried out by counting the surviving and the dead mites after seven days. The following acaricidal results were recorded:

TABLE III

Concentration ------------------------------ 0.08
Ova ----------------------------------percent__ 100
Larvae ----------------------------------do---- 100
Adults ----------------------------------do---- 95

Good results were also obtained with sprayable preparations containing, instead of the compound of Example 1(a), the compound of Example 1(b), (d) or (e), applied as described in Example 3(a) and (b).

What we claim is:
1. A composition of matter consisting essentially of N-(2-methyl-4-chlorophenyl)-N',N'-dimethylthiouera.

References Cited

FOREIGN PATENTS 6604132   10/1966   Netherlands _____ 260—552 R
959,228   5/1964    Great Britain ____ 260—552 R LEON ZITVER, Primary Examiner M. W. GLYNN, Assistant Examiner